United States Patent [19]

Steiger

[11] Patent Number: 4,535,817

[45] Date of Patent: Aug. 20, 1985

[54] DRIVE FOR AN OSCILLATORY MECHANICAL SYSTEM

[75] Inventor: Anton Steiger, Illnau, Switzerland

[73] Assignee: Sulzer Brothers Limited, Winterthur, Switzerland

[21] Appl. No.: 591,554

[22] Filed: Mar. 20, 1984

[30] Foreign Application Priority Data

Mar. 30, 1983 [CH] Switzerland ............... 1771/83

[51] Int. Cl.$^3$ ............... F15B 13/044; F16K 31/56
[52] U.S. Cl. ............... 137/625.65; 74/100 R; 251/75; 251/280; 251/129.09; 251/129.20
[58] Field of Search ............... 74/97, 100 R, 100 P, 74/106; 137/625.65; 251/75, 137, 138, 280

[56] References Cited

U.S. PATENT DOCUMENTS 3,095,901 7/1963 Larson et al. ............... 251/280 X

Primary Examiner—Gerald A. Michalsky
Attorney, Agent, or Firm—Kenyon & Kenyon

[57] ABSTRACT

A resiliently prestressed oscillatory system having two discrete operative positions is located by means of toggle levers in the limit positions of the oscillation. One of the toggle levers is in the extended state in the associated operative position and is deflected by a control device through the agency of a movable abutment until the self-locking of the toggle lever is overcome and a prestressed spring drives the system into its other end position.

The toggle levers form an amplifier reducing, for instance, by a hundred-fold to a thousand-fold, the forces which the control device is required to provide. The system can therefore be controlled directly by means of an electronic control without the need for additional pneumatic of hydraulic auxiliary systems or high power electrical systems.

8 Claims, 3 Drawing Figures

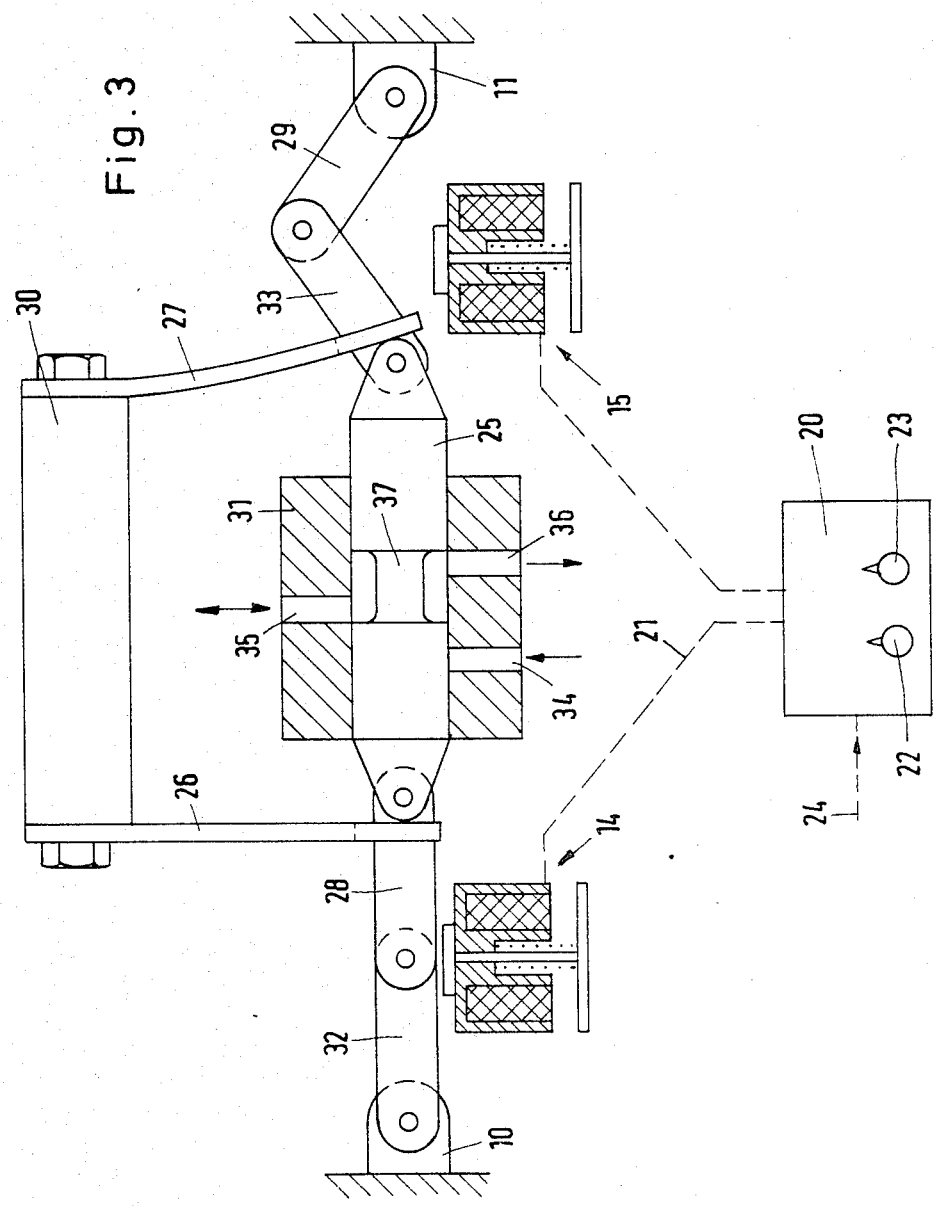

DRIVE FOR AN OSCILLATORY MECHANICAL SYSTEM

This invention relates to an oscillating mechanical system and more particularly to a drive for an oscillating mechanical system.

Heretofore, systems have been known wherein the end positions of an oscillating body are exactly defined by the system to be controlled. Examples of such systems include final control elements which move onto a fixed abutment and valve lids which seat on valve seats. Systems have also been known, such as sliding spool valves or rotary slide valves, as described in German O.S. No. 28 07 533 and German P.S. No. 30 16 823, wherein a valve body is located accurately in an end position not by the system to be controlled but by a controlling or actuating mechanism.

Drives have also been known for actuating oscillatory systems of the type wherein one operative position is an end position defined by the system to be controlled, i.e. a valve seat as described in WO-Publication (PCT-Application) No. 81/01626 and German O.S. No. 31 39 399. In these known systems, the forces arising at the elements to be controlled, e.g. at the valves, act directly on the actuating drive which has the function of retaining the element in one of two operative positions. Consequently, these known drives usually have either additional systems, such as hydraulic or pneumatic systems, or high power electromagnets or solenoids whose magnetic field can provide the necessary forces. However, even when the magnetic fields are relatively substantial, the use of direct-acting drives of this kind which have no additional system are limited to relatively small mechanical systems.

In cases where electronic means are used to produce control signals for triggering the movement of a system in either direction, the forces produced by the electronic means by way of magnetic fields is totally insufficient to retain an oscillatory system in an operative position. Hence, additional systems must be provided in order to produce the necessary retaining forces. In these cases, an electronic control means is used only to trigger the additional systems. Consequently, drives of this kind are very expensive and are liable to disturbances.

Accordingly, it is an object of the invention to reduce the forces acting on a drive for actuating an oscillatory mechanical system of relatively large mass with a minimum of energy.

It is another object of the invention to provide a drive for actuating an oscillating mechanical system without the need for auxiliary systems.

It is another object of the invention to have the magnetic forces produced by an electronic control suffice to retain a mechanical system in each of two discrete end positions and to trigger movement of the mechanical system in the event of a changeover.

Briefly, the invention provides a drive for actuating an oscillatory mechanical system which includes a first means for oscillating between two discrete operative positions and a resilient prestressing means for biasing the first means from one position to the other position.

The drive includes a pair of toggle levers which are connected to the first means so as to locate this first means in a respective operative position corresponding to an extended self-locking position of the respective toggle lever. In addition, the drive includes a pair of movable abutments each of which is disposed in the path of a respective toggle lever to inhibit overshooting of the toggle lever past the extended position thereof. Further, the drive includes a control mechanism for selectively moving the abutments to effect a deflection of a respective toggle lever from the extended self-locking position thereof.

The abutments serve to supply a minimum energy to the oscillatory mechanical system so as to compensate for the energy losses of the system.

Each toggle lever represents a mechanical force amplifier which can readily provide "amplifications" of a hundred-fold up to a thousand-fold.

The movable abutments may be of a type which can be energized by electronic signals from the control mechanism. When energized, the abutments deflect the toggles over a relatively long distance so that their reduced forces are sufficient to supply the oscillatory mechanical system with energy to make up the energy losses. The path of the abutments, i.e. the deflection of the "toggle joints" from their extended position, are such that self-locking of the toggle joint is overcome. In this respect, self-locking is due mainly to the friction forces arising in a movement of the toggle levers.

In one embodiment, the oscillatory mechanical system may employ a rotary spindle to which a two-armed lever is secured as the oscillating means. In this case, one arm of the lever is pivotally connected to the pair of toggle levers at a common point. In addititon, the prestressing means may include a flexible spring which is secured at one end to a second arm of the two-armed lever while the opposite end is secured to a resiliently deformable mount.

In another embodiment, the oscillating means may include a sliding spool valve having a casing with an inlet bore, a control bore and a discharge bore as well as a spool which is slidably mounted in the casing to selectively communicate the control bore with one of the inlet bore and outlet bore. In this case, the spool is connected at opposite ends to a respective toggle lever while the prestressing means includes a pair of spring strips, each of which is disposed at a respective end of the spool to bias the spool into the casing.

These and other objects and advantages of the invention will become more apparent from the following detailed description taken in conjunction with the accompanying drawings wherein.

FIG. 3 diagrammatically illustrates a drive for a sliding spool valve in accordance with the invention.

Figure 1:
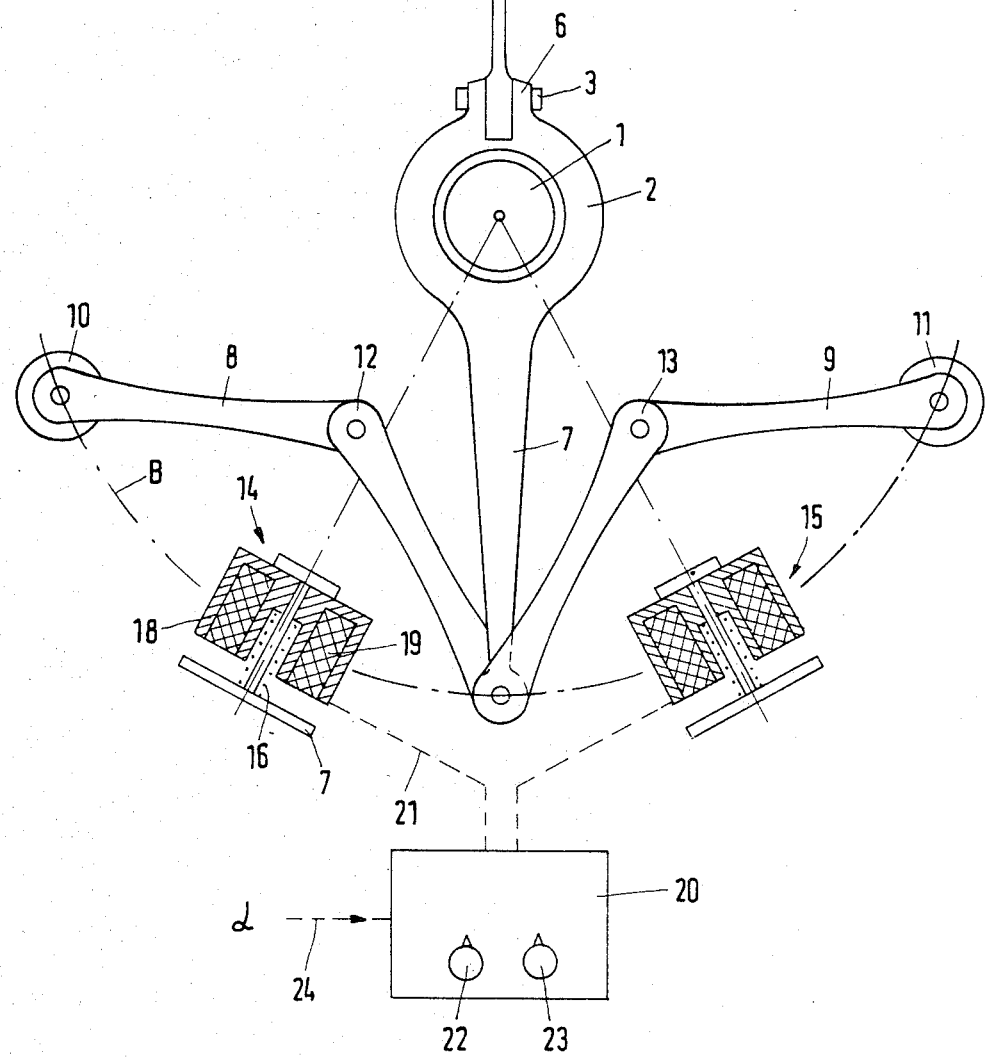
FIG. 1 illustrates a diagrammatic view of a drive for a rotary slide valve in accordance with the invention.

Referring to FIG. 1, an oscillatory mechanical system such as an oscillatory rotary slide valve (not shown), for instance, of the kind disclosed in German P.S. No. 3016823, is disposed on a means such as a central spindle 1 for oscillating between two discrete operative positions. As previously stated, a rotary slide valve of this kind has no definitive end position determined by the system to be controlled.

In addition, a two-armed lever 2 is rigidly secured to the spindle 1.

In addition, a resilient prestressing means is provided for biasing the spindle 1 and lever 2 from one operative position to the other operative position. This prestressing means includes a flexible spring 4, such as a leaf spring, which is secured at one end to one lever arm 6 in a pivotal manner by way of a pivot 3. The opposite end of the spring 4 is secured to a resiliently deformable mount 5.

The drive for the oscillatory mechanical system includes a pair of toggle levers 8, 9 which are pivotally connected to the end of the other lever arm 7 at a common point. Each toggle lever 8, 9 is rotatably mounted on fixed points 10, 11 which lie on an arc B which the other toggle ends, together with the end of the arm 7, describe when rotating about the spindle 1. As indicated, each toggle lever 8, 9 has a joint 12, 13 at an intermediate point.

Figure 2:
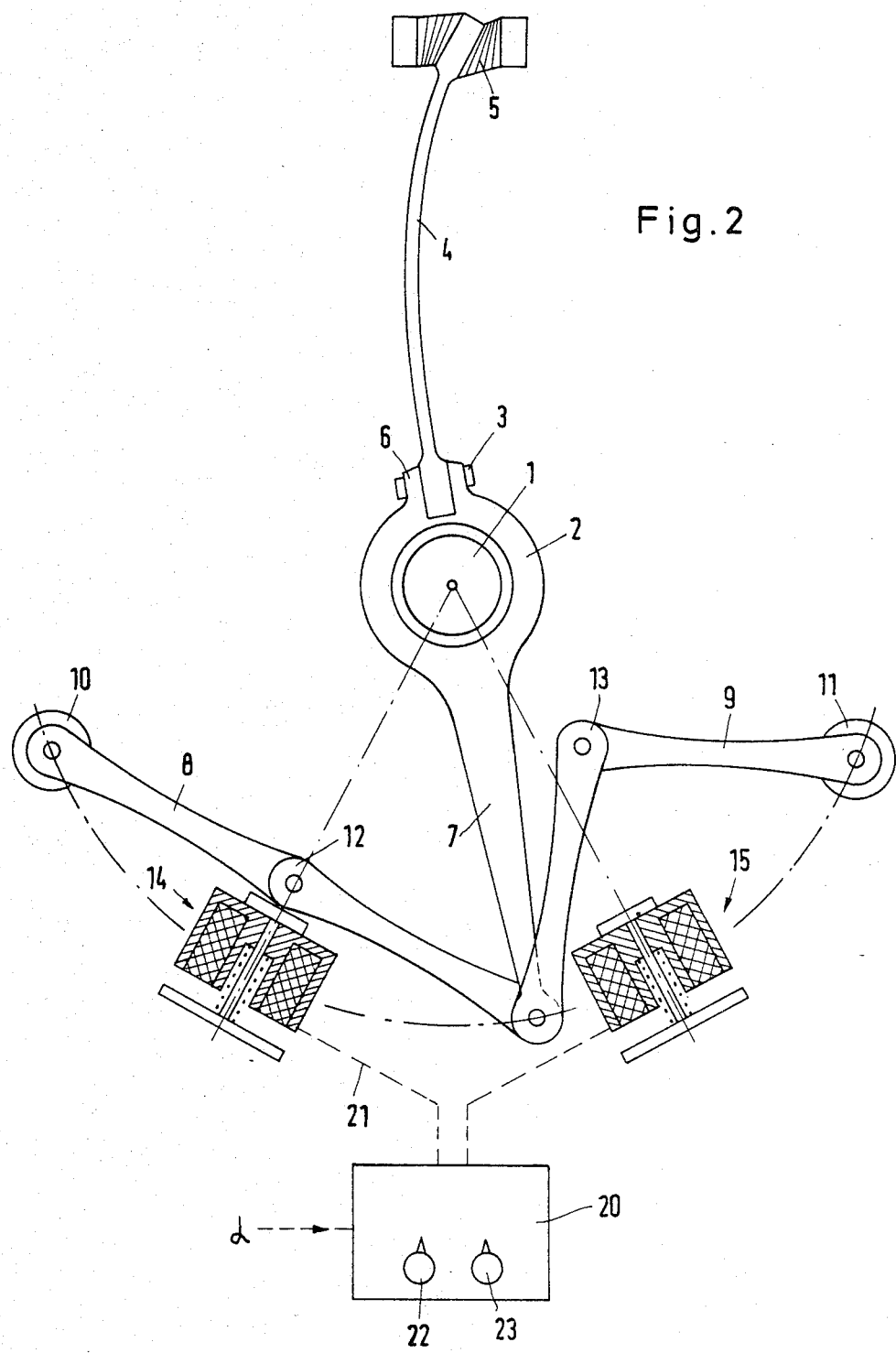
FIG. 2 illustrates the drive of FIG. 1 in one operative position.

When the oscillatory system S comprising the components 1,2,4,5, and 7 is in an operative position or end position, the spring 4 is in a stressed state as shown in FIG. 2. This state is produced, for example, by a stressing tool (not shown). In this state, the arm 7 has been deflected from the neutral position shown in FIG. 1 so that one of the toggle levers (8) is extended while the other toggle lever (9) is bent at the joint 13 to the maximum possible angle. In the extended position, the toggle lever (8) is self-locking.

The drive also includes a pair of movable abutments 14, 15 each of which is disposed in the path of a respective toggle lever 8, 9 to inhibit overshooting of the toggle lever past the extended position thereof. In the example shown, the abutment 14 includes an electromagnet or solenoid having an armature 17 which is movable against the force of a spring 16 within a core 18 in which a winding 19 is disposed. The abutment 15 for the toggle lever 9 is constructed in a similar manner. The two abutments 14, 15 are so positioned as to cooperate with the toggle joints 12, 13.

The drive also includes a control mechanism 20 for selectively moving the abutments 14, 15, i.e. the armatures 17 of the respective abutments in order to effect a deflection of a toggle lever 8, 9 from an extended self-locking position as indicated in FIG. 2. This control mechanism 20 is in the form of an electronic control which is able to emit a pulse signal to the winding 19 of a selected abutment 14, 15 via a suitable signal line 21. The electronic control 20 has an independent set-value adjustment 22, 23 for the left-hand and right-hand abutments 14, 15, respectively, and receives an input signal by way of a signal line 24, for example, a signal representing the crank angle α of an internal combustion engine.

In use, the oscillatory mechanical system S operates at a predetermined natural frequency so that the transit time from one end position or operative position to the other is fixed. Consequently, all that can be varied is the beginning of the movement in either direction, i.e. the time of triggering a movement of the right-hand or left-hand toggle lever 8 or 9 or of the abutment 14 or 15. This triggering time can be adjusted independently for each abutment 14, 15 by means of the set-value adjustment 22, 23.

At the initial assembly or after servicing or repairs, a tensioning tool (not shown) is used to move the lever 2 against the force of the spring 4, for example, into the right-hand limit position illustrated in FIG. 2. In this position, the left-hand toggle lever 8 blocks the system S with the armature 16 of the left-hand abutment 14 defining the extended position of the toggle lever 8.

When the control device 20 receives an input signal by way of the line 24 to output a signal to trigger the left-hand abutment 14, the armature 16 moves toward the joint 12 of the toggle lever 8 so that the lever is deflected in the same direction. The deflection is of sufficient extent such that the self-locking of the toggle lever system 8, 9 is overcome to permit the spring 4 to accelerate the system S to the left as viewed in FIG. 2. This movement continues until the right-hand toggle lever 9 stops the system S in the left-hand position as a result of the joint 13 abutting the abutment 15. In this position, the toggle lever 9 is located in an extended self-locking position. In addition, in the examples selected, the rotary slide valve (not shown) has reached a second discrete end position. A return movement to the initial position of FIG. 2 is triggered by the control device 20 sending a signal to the right-hand abutment 14 with the return movement of oscillation proceeding in the manner hereinbefore described.

The energy delivered by the abutments (i.e. solenoids) 14, 15 is greater than the energy dissipated in the complete system S so that there is no overall shortfall of energy. The required energy is supplied by the current injected into the winding 19.

The toggle levers 8, 9 can amplify the forces provided by the drive depending upon the coefficient of friction within the complete system, from one hundred-fold to one thousand-fold.

Referring to FIG. 3, wherein like reference characters indicate like parts as above, the drive may be used for an oscillatory mechanical system which is in the form of a linearly reciprocated system, for example, for a sliding spool valve. In this case, the oscillatory mechanical system includes a casing 31 including an inlet bore 34, a control bore 35 and a discharge bore 36 as well as a spool 25 which is slidably mounted in the casing 31 to selectively communicate the control bore 35 with one or the other of the inlet bore 34 and outlet bore 36. In addition, a prestressing means in the form of a pair of spring strips 26, 27 is provided for biasing the spool 25 from one end position to another end position. As shown, these spring strips 26, 27 are rigidly secured to a cross-member 30 in cantilever manner and abut against opposite ends of the spool 25.

The spool 25 may otherwise be part of a hydraulic system so as to control the flow of a fluid to and from a chamber or the like connected with the control bore 35 in the casing 31.

The drive for the sliding spool valve includes a pair of toggle levers 28, 32; 29, 33 each of which is pivotally secured to an opposite end of the spool 25 and pivotally secured to fixed points 10, 11 at opposite ends.

The operation of the drive is similar to that described above with respect to FIGS. 1 and 2. That is, with the spool 25 in the end or operative position illustrated in FIG. 3, the control bore 35 communicates via a groove 37 in the spool with the discharge bore 36. In this position, the spring 27 is prestressed while the toggle lever 28, 32 is in an extended self-locking position abutting against the armature of the left-hand abutment 14. When a control signal is delivered via the signal line 21 to the abutment 14, the toggle lever 28, 32 is deflected. This permits the spring 27 to slide the spool 25 within the casing 31 to the left, as viewed. At the same time, the toggle lever 29, 33 approaches the extended position against the abutment 15 while the spring 26 is flexed into a stressed condition. Upon reaching the second operative position, the spool 25 permits communication between the control bore 35 and the inlet bore 34.

The invention thus provides a drive for an oscillatory mechanical system having two discrete operative positions wherein the system experiences resilient prestressing in both of the operative positions and which is moved during an adjustment or changeover with reduced friction while remaining substantially free from external disturbing forces. In this regard, the term "external disturbing forces" is intended to mean, for instance, retarding or driving forces caused by gases or liquids.

The invention further provides a drive of relatively simple construction which uses minimal energy to effect actuation of the system.

What is claimed is:

1. In combination
   an oscillatory mechanical system having a first means for oscillating between two discrete operative positions and a resilient prestressing means for biasing said first means from one position to the other position; and
   a drive for actuating said system, said drive including a pair of toggle levers connected to said first means, each said toggle lever being disposed to locate said first means in a respective operative position corresponding to an extended self-locking position of said respective toggle lever, a pair of movable abutments, each said abutment being disposed in the path of a respective toggle lever to inhibit overshooting of said respective toggle lever past said extended position thereof, and a control mechanism for selectively moving said abutments to effect a deflection of a respective toggle lever from an extended self-locking position thereof.

2. The combination as set forth in claim 1 wherein said first means includes a rotary spindle and a two-armed lever secured to said spindle, said lever having one arm thereof pivotally connected to said pair of toggle levers.

3. The combination as set forth in claim 2 wherein said prestressing means includes a flexible spring secured at one end to a second arm of said two-armed lever and a resiliently deformable mount secured to said spring at an opposite end thereof.

4. The combination as set forth in claim 3 wherein each abutment includes an electromagnet having a movable armature for abutting a respective toggle lever.

5. The combination as set forth in claim 1 wherein said first means includes a sliding spool valve having a casing including an inlet bore, a control bore and a discharge bore and a spool slidably mounted in said casing to selectively communicate said control bore with one of said inlet bore and said outlet bore, said spool being connected at opposite ends to a respective toggle lever.

6. The combination as set forth in claim 5 wherein said prestressing means includes a pair of spring strips, each said spring strip being disposed at a respective end of said spool to bias said spool into said casing.

7. The combination as set forth in claim 6 wherein each abutment includes an electromagnet having a movable armature for abutting a respective toggle lever.

8. The combination as set forth in claim 1 wherein said first means is linearly reciprocal.

* * * * *